United States Patent
Akutsu et al.

(10) Patent No.: US 10,840,832 B2
(45) Date of Patent: Nov. 17, 2020

(54) PERMANENT-MAGNET THREE-PHASE DUPLEX MOTOR AND ELECTRIC POWER STEERING APPARATUS

(71) Applicant: Mitsubishi Electric Corporation, Tokyo (JP)

(72) Inventors: Satoru Akutsu, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/544,289

(22) PCT Filed: Feb. 17, 2015

(86) PCT No.: PCT/JP2015/054261
§ 371 (c)(1),
(2) Date: Jul. 18, 2017

(87) PCT Pub. No.: WO2016/132450
PCT Pub. Date: Aug. 25, 2016

(65) Prior Publication Data
US 2017/0366115 A1    Dec. 21, 2017

(51) Int. Cl.
*H02P 21/00*  (2016.01)
*H02P 6/12*   (2006.01)
(Continued)

(52) U.S. Cl.
CPC ............ *H02P 6/12* (2013.01); *B62D 5/0484* (2013.01); *H02K 1/16* (2013.01); *H02K 1/274* (2013.01);
(Continued)

(58) Field of Classification Search
CPC ........ B62D 5/0484; H02K 1/16; H02K 1/274; H02K 1/278; H02K 21/14; H02K 21/16;
(Continued)

(56) References Cited

U.S. PATENT DOCUMENTS

| 8,981,706 B2* | 3/2015 | Uryu | H02P 29/0241 |
| | | | 318/801 |
| 2011/0156627 A1* | 6/2011 | Nakamura | B62D 5/0403 |
| | | | 318/400.22 |

(Continued)

FOREIGN PATENT DOCUMENTS

| JP | 60-128852 A | 7/1985 |
| JP | 2004-364352 A | 12/2004 |

(Continued)

OTHER PUBLICATIONS

International Search Report of PCT/JP2015/054261, dated May 12, 2015. [PCT/ISA/210].

(Continued)

*Primary Examiner* — Eduardo Colon Santana
*Assistant Examiner* — Zemenay T Truneh
(74) *Attorney, Agent, or Firm* — Sughrue Mion, PLLC; Richard C. Turner

(57) ABSTRACT

A permanent-magnet three-phase duplex motor is provided with two systems, namely a system that includes a first three-phase winding and a first inverter circuit, and a system that includes a second three-phase winding and a second inverter circuit, and a controlling apparatus is configured such that when one system fails, the controlling apparatus stops operation of the inverter circuit of the failed system, and controls operation of the inverter circuit of the normal system to increase the driving current that is supplied from the inverter circuit of the normal system, and the first three-phase winding and the second three-phase winding are configured such that magnetic fields that act on the permanent magnets in a demagnetizing direction when the increased driving current is supplied from the inverter circuit of the normal system are equal to magnetic fields that (Continued)

normally act on the permanent magnets in the demagnetizing direction.

8 Claims, 14 Drawing Sheets

(51) Int. Cl.
| | |
|---|---|
| *H02P 27/06* | (2006.01) |
| *H02K 21/16* | (2006.01) |
| *H02K 21/14* | (2006.01) |
| *H02P 6/00* | (2016.01) |
| *H02P 29/032* | (2016.01) |
| *B62D 5/04* | (2006.01) |
| *H02K 1/16* | (2006.01) |
| *H02K 1/27* | (2006.01) |
| *H02K 3/12* | (2006.01) |
| *H02K 3/28* | (2006.01) |
| *H02P 6/08* | (2016.01) |
| *H02P 25/22* | (2006.01) |
| *H02P 27/04* | (2016.01) |

(52) U.S. Cl.
CPC ................. *H02K 3/12* (2013.01); *H02K 3/28* (2013.01); *H02K 21/14* (2013.01); *H02K 21/16* (2013.01); *H02P 6/005* (2013.01); *H02P 6/085* (2013.01); *H02P 21/50* (2016.02); *H02P 25/22* (2013.01); *H02P 27/06* (2013.01); *H02P 29/032* (2016.02); *B62D 5/0403* (2013.01); *H02K 1/278* (2013.01); *H02K 2213/06* (2013.01); *H02P 2207/055* (2013.01)

(58) Field of Classification Search
CPC ........ H02K 2213/06; H02K 3/12; H02K 3/28; H02P 21/50; H02P 2207/055; H02P 25/22; H02P 27/06; H02P 29/032; H02P 6/005; H02P 6/085; H02P 6/12
USPC .................................... 318/724, 801, 400.02
See application file for complete search history.

(56) References Cited

U.S. PATENT DOCUMENTS

| | | | |
|---|---|---|---|
| 2012/0032551 A1* | 2/2012 | Yoneda ..................... | H02K 3/12 310/214 |
| 2012/0139380 A1 | 6/2012 | Taniguchi | |
| 2014/0009093 A1* | 1/2014 | Suzuki ..................... | H02P 21/50 318/400.02 |
| 2014/0191628 A1* | 7/2014 | Nakano ................ | H02K 1/2746 310/68 B |

FOREIGN PATENT DOCUMENTS

| | | |
|---|---|---|
| JP | 2011-078221 A | 4/2011 |
| JP | 2012-125006 A | 6/2012 |
| JP | 5028220 B2 | 9/2012 |

OTHER PUBLICATIONS

Communication dated Sep. 21, 2018, from the European Patent Office in counterpart European Application No. 15882554.7.

\* cited by examiner

PERMANENT-MAGNET THREE-PHASE DUPLEX MOTOR AND ELECTRIC POWER STEERING APPARATUS

CROSS REFERENCE TO RELATED APPLICATIONS

This application is a National Stage of International Application No. PCT/JP2015/054261 filed Feb. 17, 2015, the contents of all of which are incorporated herein by reference in their entirety.

TECHNICAL FIELD

The present invention relates to a permanent-magnet three-phase duplex motor and to an electric power steering apparatus that includes that motor.

BACKGROUND ART

In conventional permanent-magnet three-phase duplex motors, when one system fails, driving current to the system that is normal is increased, compensating for torque reductions in the system that has failed (see Patent Literature 1, for example).

CITATION LIST

Patent Literature

Patent Literature 1: Japanese Patent Laid-Open No. 2011-78221 (Gazette)

SUMMARY OF THE INVENTION

Problem to be Solved by the Invention

In conventional permanent-magnet three-phase duplex motors, when one system fails, because driving current to the system that is normal is increased, magnetic fields that act in a demagnetizing direction on permanent magnets that constitute magnetic poles of a rotor increase. Thus, one problem has been that the permanent magnets demagnetize, reducing motor performance.

In order to avoid this, it is conceivable to make the design such that the permanent magnets do not demagnetize even if twice as much driving current as normal flows. In that case, the motor must be operated at half capacity normally, and new problems arise such as body dimensions of the motor simply being doubled in order to generate required torque.

The present invention aims to solve the above problems and an object of the present invention is to provide a permanent-magnet three-phase duplex motor and an electric power steering apparatus that includes that motor that suppresses demagnetization of permanent magnets that results from increases in driving current and that can ensure motor performance that is equal to normal levels when failure of one system occurs, without increasing motor body dimensions significantly.

Means for Solving the Problem

A permanent-magnet three-phase duplex motor according to the present invention includes: a rotor in which permanent magnets are arranged circumferentially; a stator that includes a stator coil that is constituted by a first three-phase winding and a second three-phase winding; a first inverter circuit that supplies a driving current to the first three-phase winding; a second inverter circuit that supplies a driving current to the second three-phase winding; and a controlling apparatus that controls operation of the first inverter circuit and the second inverter circuit. The controlling apparatus is configured such that when one of the first inverter circuit and the second inverter circuit fails, the controlling apparatus stops operation of the failed inverter circuit, and controls operation of a normal inverter circuit to increase the driving current that is supplied from the normal inverter circuit, and the first three-phase winding and the second three-phase winding are configured such that magnetic fields that act on the permanent magnets in a demagnetizing direction when the increased driving current is supplied from the normal inverter circuit are equal to magnetic fields that normally act on the permanent magnets in the demagnetizing direction.

Effects of the Invention

According to the present invention, when one of the first inverter circuit and the second inverter circuit fails, because the controlling apparatus stops operation of the failed inverter circuit, and controls operation of a normal inverter circuit to increase the driving current that is supplied from the normal inverter circuit, required torque can be ensured even if one of the first inverter circuit and the second inverter circuit fails. Because the first three-phase winding and the second three-phase winding are configured such that magnetic fields that act on the permanent magnets in a demagnetizing direction when the increased driving current is supplied from the normal inverter circuit are equal to magnetic fields that normally act on the permanent magnets in the demagnetizing direction, demagnetization of the permanent magnets can be avoided even if an increased driving current is supplied from the normal inverter circuit. Motor performance that is equal to normal levels can thereby be ensured during failure of one system without increasing motor body dimensions.

DESCRIPTION OF EMBODIMENTS

Embodiment 1

Figure 1:
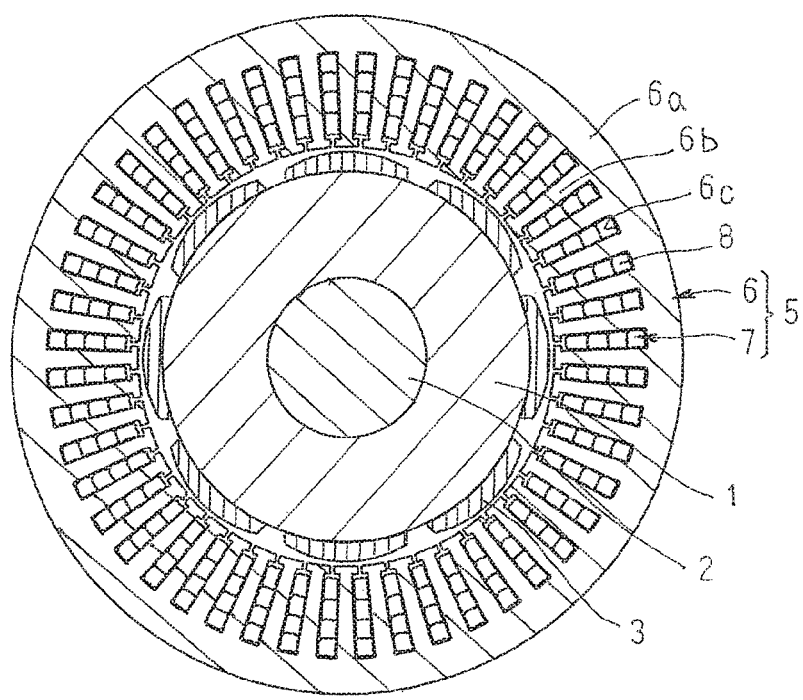
FIG. 1 is a lateral cross section that shows a permanent-magnet three-phase duplex motor according to Embodiment 1 of the present invention.
Figure 2:
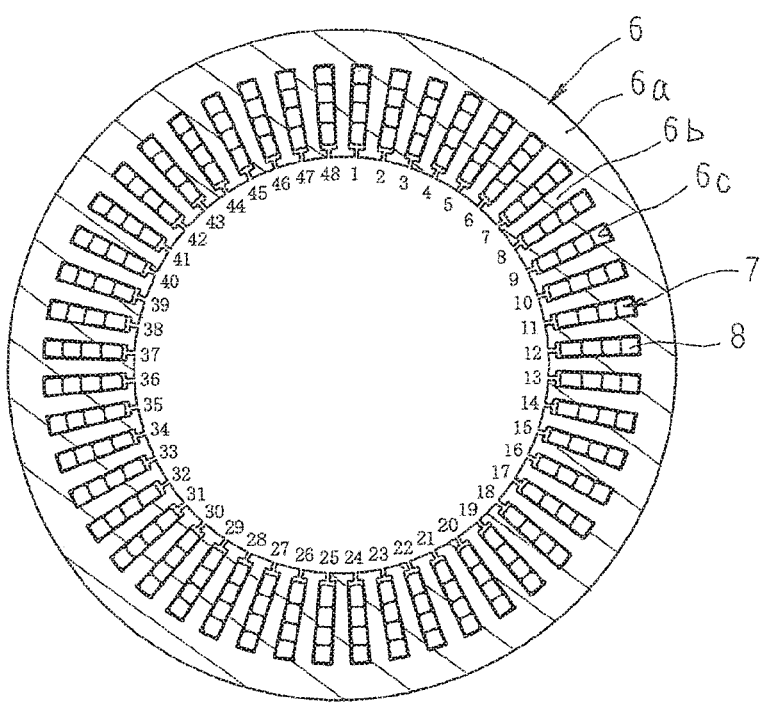
FIG. 2 is a lateral cross section that shows a stator that is used in the permanent-magnet three-phase duplex motor according to Embodiment 1 of the present invention.

FIG. 1 is a lateral cross section that shows a permanent-magnet three-phase duplex motor according to Embodiment 1 of the present invention, and FIG. 2 is a lateral cross section that shows a stator that is used in the permanent-magnet three-phase duplex motor according to Embodiment 1 of the present invention. Here, a "lateral cross section" is a view that represents a plane that is perpendicular to a central axis of the rotating shaft of the rotor. Furthermore, in FIG. 2, numerals from 1 through 48 that are printed circumferentially inside the stator core represent slot numbers that are allotted sequentially clockwise to slots that are arranged circumferentially.

In FIGS. 1 and 2, a permanent-magnet three-phase duplex motor 100 includes: a rotor 1 that is fixed to a rotating shaft 2 that is inserted into a central position thereof, and that is rotatably held in a housing (not shown); and a stator 5 that is held in the housing so as to be disposed coaxially with the rotor 1 so as to surround the rotor 1. Eight permanent magnets 3 that form magnetic poles are disposed on an outer circumferential surface of the rotor 1 at a uniform angular pitch circumferentially. The stator 5 includes a stator core 6 that is produced by stacking and integrating electromagnetic steel sheets, in which forty-eight teeth 6b each protrude radially inward from an annular core back 6a so as to be arranged at a uniform angular pitch circumferentially; and a stator coil 7 that is mounted to the stator core 6. Slots 6c are formed between the core back 6a and adjacent teeth 6b. The permanent-magnet three-phase duplex motor 100 that is configured in this manner is an eight-pole forty-eight-slot motor, in which a pitch of one slot corresponds to thirty electrical degrees.

Figure 3:
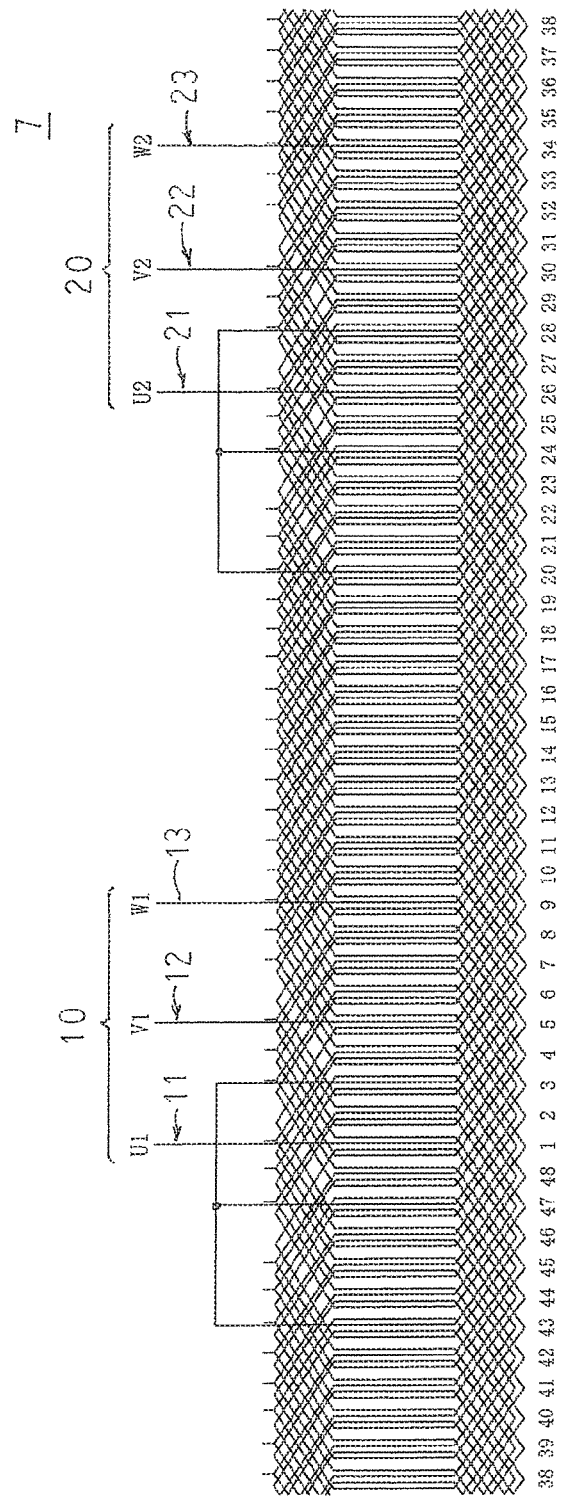
FIG. 3 is a developed projection that shows a stator coil of the stator that is used in the permanent-magnet three-phase duplex motor according to Embodiment 1 of the present invention.
Figure 4:
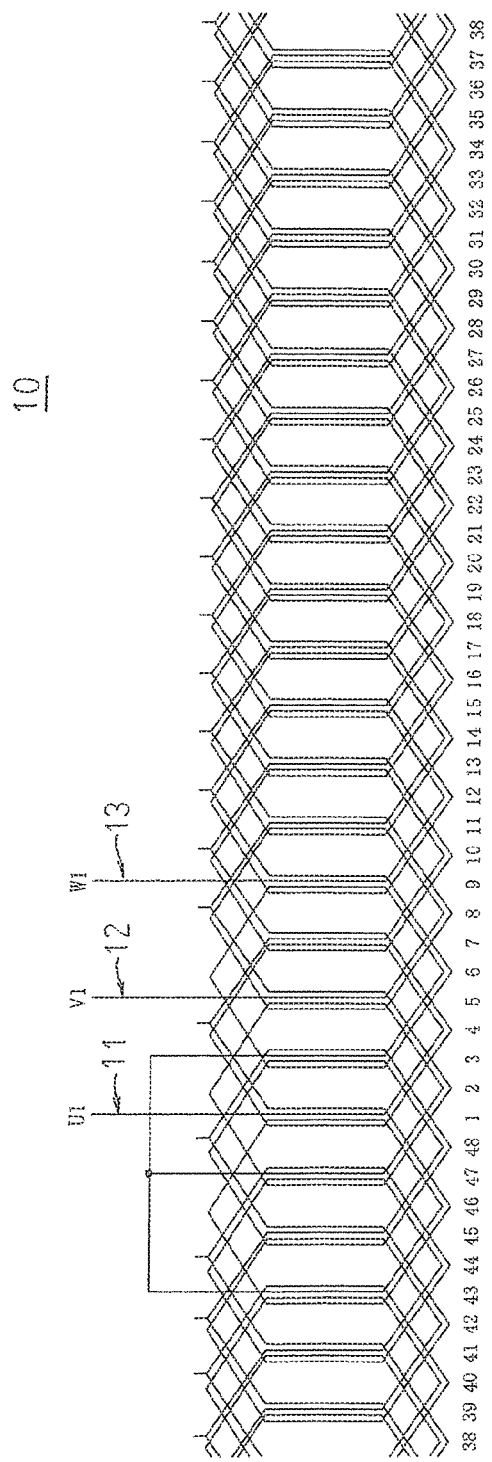
FIG. 4 is a developed projection that shows a first three-phase winding that constitutes part of the stator coil of the stator that is used in the permanent-magnet three-phase duplex motor according to Embodiment 1 of the present invention.
Figure 5:
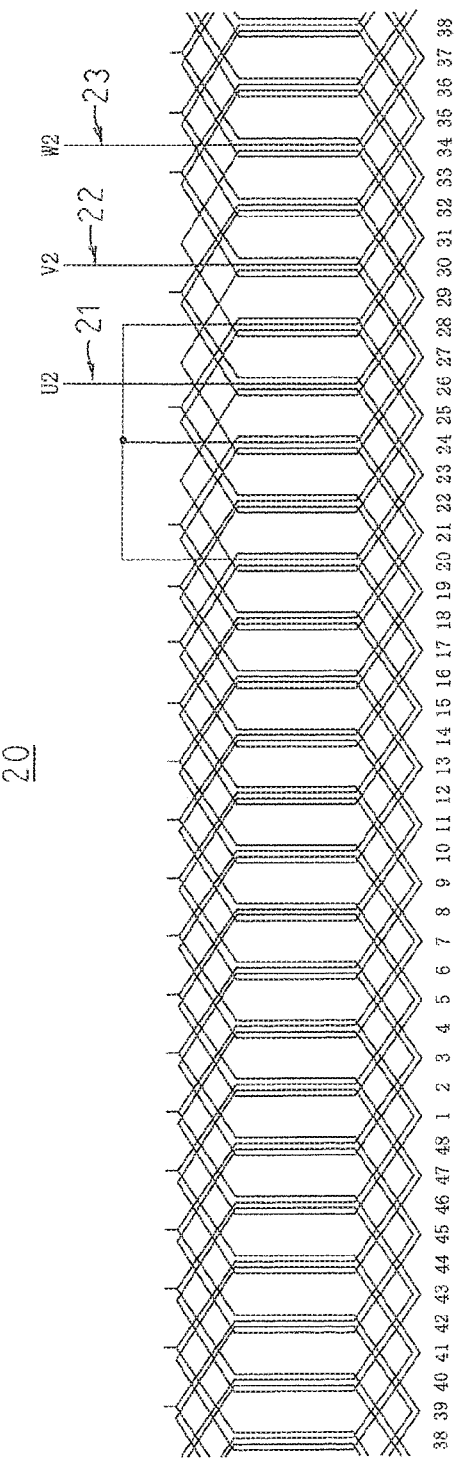
FIG. 5 is a developed projection that shows a second three-phase winding that constitutes part of the stator coil of the stator that is used in the permanent-magnet three-phase duplex motor according to Embodiment 1 of the present invention.
Figure 6:
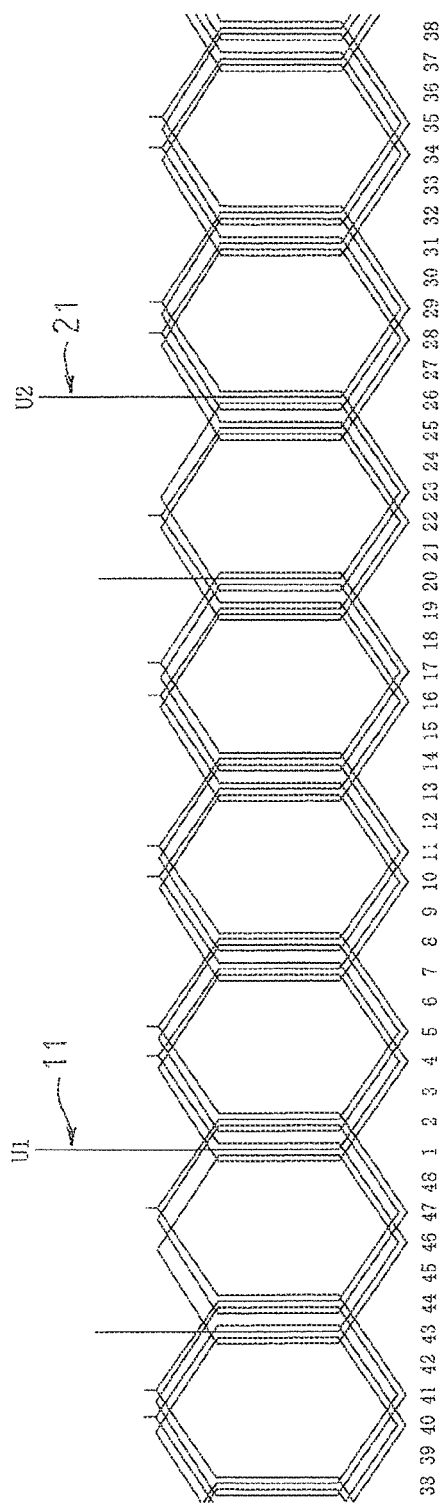
FIG. 6 is a developed projection that shows a U1-phase winding and a U2-phase winding that constitute part of the stator coil of the stator that is used in the permanent-magnet three-phase duplex motor according to Embodiment 1 of the present invention.
Figure 7:
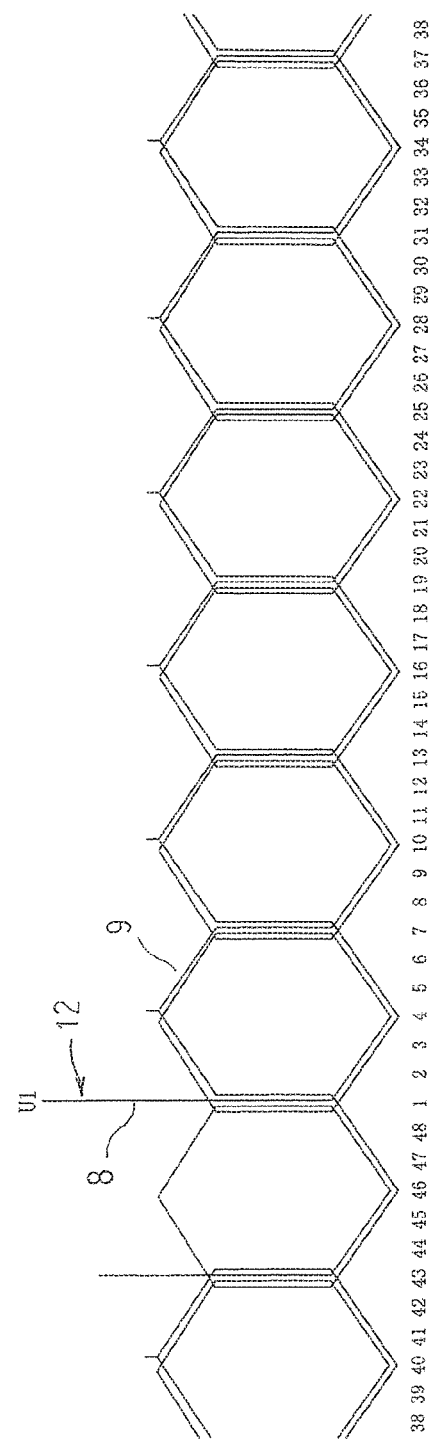
FIG. 7 is a developed projection that shows the U1-phase winding that constitutes part of the stator coil of the stator that is used in the permanent-magnet three-phase duplex motor according to Embodiment 1 of the present invention.
Figure 8:
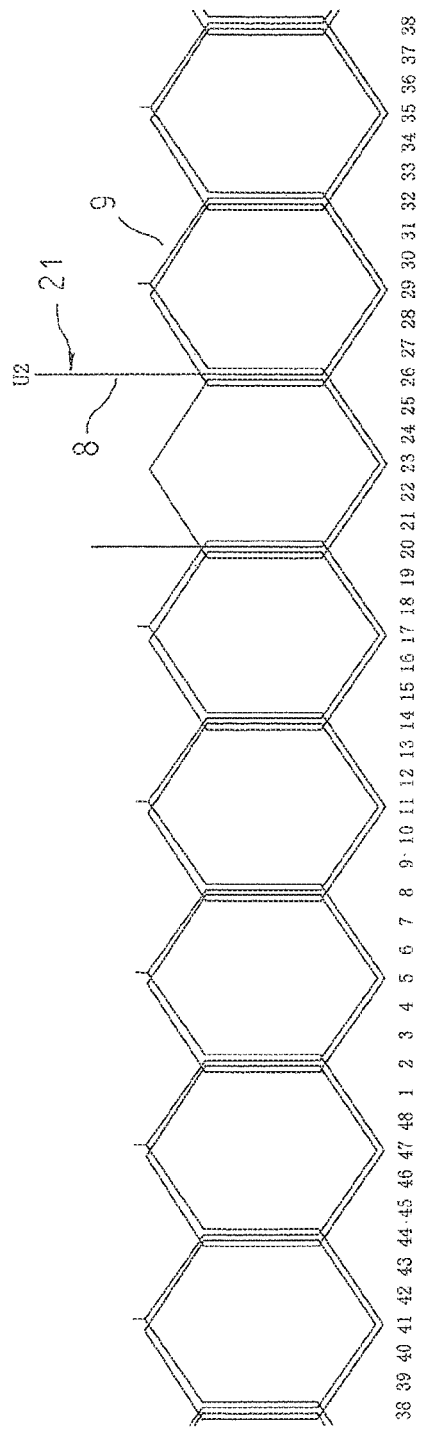
FIG. 8 is a developed projection that shows the U2-phase winding that constitutes part of the stator coil of the stator that is used in the permanent-magnet three-phase duplex motor according to Embodiment 1 of the present invention.
Figure 9:
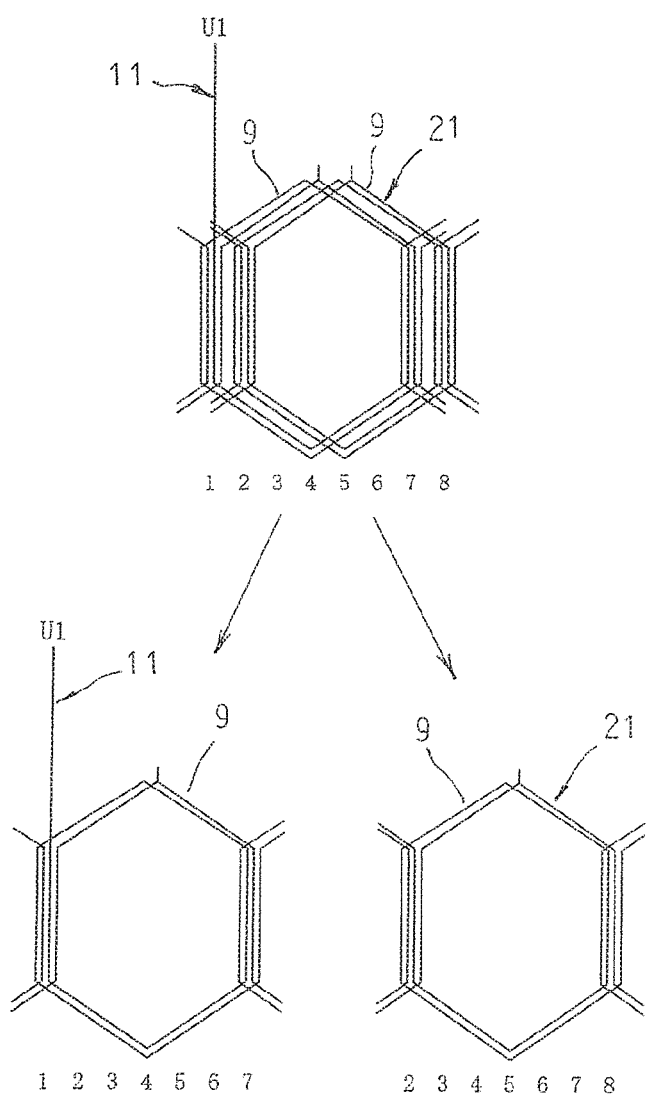
FIG. 9 is a partial developed projection that explains an overlapped state of units coils of the U1-phase winding and U2-phase winding that constitute part of the stator coil of the stator that is used in the permanent-magnet three-phase duplex motor according to Embodiment 1 of the present invention.

Next, construction of the stator coil 7 will be explained with reference to FIGS. 3 through 9. FIG. 3 is a developed projection that shows a stator coil of the stator that is used in the permanent-magnet three-phase duplex motor according to Embodiment 1 of the present invention, FIG. 4 is a developed projection that shows a first three-phase winding that constitutes part of the stator coil of the stator that is used in the permanent-magnet three-phase duplex motor according to Embodiment 1 of the present invention, FIG. 5 is a developed projection that shows a second three-phase winding that constitutes part of the stator coil of the stator that is used in the permanent-magnet three-phase duplex motor according to Embodiment 1 of the present invention, FIG. 6 is a developed projection that shows a U1-phase winding and a U2-phase winding that constitute part of the stator coil of the stator that is used in the permanent-magnet three-phase duplex motor according to Embodiment 1 of the present invention, FIG. 7 is a developed projection that shows the U1-phase winding that constitutes part of the stator coil of the stator that is used in the permanent-magnet three-phase duplex motor according to Embodiment 1 of the present invention, FIG. 8 is a developed projection that shows the U2-phase winding that constitutes part of the stator coil of the stator that is used in the permanent-magnet three-phase duplex motor according to Embodiment 1 of the present invention, and FIG. 9 is a partial developed projection that explains an overlapped state of units coils of the U1-phase winding and U2-phase winding that constitute part of the stator coil of the stator that is used in the permanent-magnet three-phase duplex motor according to Embodiment 1 of the present invention. Moreover, in each of the figures, the numerals 1 through 48 that are allotted to lower portions of the windings are slot numbers.

As shown in FIGS. 3 through 5, the stator coil 7 includes: a first three-phase winding 10 that is formed by wye-connecting a U1-phase winding 11, a V1-phase winding 12, and a W1-phase winding 13; and a second three-phase winding 20 that is formed by wye-connecting a U2-phase winding 21, a V2-phase winding 22, and a W2-phase winding 23.

First, a winding construction of the U1-phase winding 11 will be explained.

As shown in FIG. 7, a conductor wire 8 is inserted into the slot 6c at Number 1 from a first axial end of the stator core 6 and is led out at a second axial end of the stator core 6, is next inserted into the slot 6c at Number 7 from the second axial end of the stator core 6 and is led out at the first axial end of the stator core 6, is next inserted into the slot 6c at Number 1 from the first axial end of the stator core 6 and is led out at the second axial end of the stator core 6, and is next inserted into the slot 6c at Number 7 from the second axial end of the stator core 6 and is led out at the first axial end of the stator core 6.

The conductor wire 8 that is led out at the first axial end of the stator core 6 from the slot 6c at Number 7 is wound into a pair of slots 6c at Numbers 13 and 19 in a similar manner, is next wound into a pair of slots 6c at Numbers 25 and 31 in a similar manner, is next wound into a pair of slots 6c at Numbers 37 and 43 in a similar manner, and is led out from the slot 6c at Number 43 at the first axial end of the stator core 6.

The conductor wire 8 that is led out at the first axial end of the stator core 6 from the slot 6c at Number 43 is wound into a pair of slots 6c at Numbers 37 and 31 in a similar manner, is next wound into a pair of slots 6c at Numbers 25 and 19 in a similar manner, is next wound into a pair of slots 6c at Numbers 13 and 7 in a similar manner, is next wound into a pair of slots 6c at Numbers 1 and 43 in a similar manner, and is led out from the slot 6c at Number 43 at the first axial end of the stator core 6, thereby configuring the U1-phase winding 11.

The U1-phase winding 11 that is configured in this manner is a distributed lap winding that is configured by winding the conductor wire 8 into a group of slots 6c in which the slot numbers are Numbers (1+6n), where n is an integer that is greater than or equal to 0 and less than or equal to 7. The U1-phase winding 11 is wound at a pitch of six slots, i.e., a pitch of 180 electrical degrees, and is a full-pitch winding. An end portion of the conductor wire 8 that is led out at the first axial end of the stator core 6 from the slot 6c at Number 1 constitutes an output wire of the U1-phase winding 11, and an end portion of the conductor wire 8 that is led out at the first axial end of the stator core 6 from the slot 6c at Number 43 constitutes a neutral-point connecting portion of the U1-phase winding 11. As shown in FIG. 9, a winding that is produced by winding the conductor wire 8 into the pair of slots 6c at Numbers 1 and 7, for example, i.e., a pair of slots 6c that are separated by a pitch of six slots, constitutes a unit coil 9. The U1-phase winding 11 is formed by connecting eight unit coils 9 in series. As shown in FIG. 2, four conductor wires 8 are housed so as to line up in single columns in a radial direction inside the slots 6 so as to have insulating papers (not shown) interposed.

Next, a winding construction of the U2-phase winding 21 will be explained.

As shown in FIG. 8, a conductor wire 8 is inserted into the slot 6c at Number 26 from a first axial end of the stator core 6 and is led out at a second axial end of the stator core 6, is next inserted into the slot 6c at Number 32 from the second axial end of the stator core 6 and is led out at the first axial end of the stator core 6, is next inserted into the slot 6c at Number 26 from the first axial end of the stator core 6 and is led out at the second axial end of the stator core 6, and is next inserted into the slot 6c at Number 32 from the second axial end of the stator core 6 and is led out at the first axial end of the stator core 6.

The conductor wire 8 that is led out at the first axial end of the stator core 6 from the slot 6c at Number 32 is wound into a pair of slots 6c at Numbers 38 and 44 in a similar manner, is next wound into a pair of slots 6c at Numbers 2 and 8 in a similar manner, is next wound into slots 6c at Numbers 14 and 20 in a similar manner, and is led out from the slot 6c at Number 20 at the first axial end of the stator core 6.

The conductor wire 8 that is led out at the first axial end of the stator core 6 from the slot 6c at Number 20 is wound into a pair of slots 6c at Numbers 14 and 8 in a similar manner, is next wound into a pair of slots 6c at Numbers 2 and 44 in a similar manner, is next wound into a pair of slots 6c at Numbers 38 and 32 in a similar manner, is next wound into a pair of slots 6c at Numbers 26 and 20 in a similar manner, and is led out from the slot 6c at Number 20 at the first axial end of the stator core 6, thereby configuring the U2-phase winding 21.

The U2-phase winding 21 that is configured in this manner is a distributed lap winding that is configured by winding the conductor wire 8 into a group of slots 6c in which the slot numbers are Numbers (2+6n), where n is an integer that is greater than or equal to 0 and less than or equal to 7. The U2-phase winding 21 is wound at a pitch of six slots, i.e., a pitch of 180 electrical degrees, and is a full-pitch winding. An end portion of the conductor wire 8 that is led out at the first axial end of the stator core 6 from the slot 6c at Number 26 constitutes an output wires of the U2-phase winding 21, and an end portion of the conductor wire 8 that is led out at the first axial end of the stator core 6 from the slot 6c at Number 20 constitutes a neutral-point connecting portion of the U2-phase winding 21. As shown in FIG. 9, a winding that is produced by winding the conductor wire 8 into the pair of slots 6c at Numbers 2 and 8, for example, i.e., a pair of slots 6c that are separated by a pitch of six slots, constitutes a unit coil 9. The U2-phase winding 21 is formed by connecting eight unit coils 9 in series.

As shown in FIG. 6, the U1-phase winding 11 and the U2-phase winding 21 are same-phase windings that are mounted into groups of slots 6c that are offset by thirty electrical degrees. As shown in FIG. 9, the unit coils 9 of the U1-phase winding 11 and the U2-phase winding 21 overlap for five slots 6c out of the six slots 6c that constitute the slot pitch of the unit coils 9. In other words, the circumferential regions between the slots 6c into which the same-phase unit coils 9 are wound approximately overlap.

Now, because the winding constructions of the V1-phase winding 12, the V2-phase winding 22, the W1-phase winding 13, and the W2-phase winding 23 are similar or identical to the winding constructions of the U1-phase winding 11 and the U2-phase winding 21, explanation thereof will be omitted here. Moreover, the V1-phase winding 12 is configured by winding a conductor wire 8 into a group of slots 6c in which the slot numbers are Numbers (5+6n), where n is an integer that is greater than or equal to 0 and less than or equal to 7, and the V2-phase winding 22 is configured by winding a conductor wire 8 into a group of slots 6c in which the slot numbers are Numbers (6+6n), where n is an integer that is greater than or equal to 0 and less than or equal to 7. Furthermore, the W1-phase winding 13 is configured by winding a conductor wire 8 into a group of slots 6c in which the slot numbers are Numbers (3+6n), where n is an integer that is greater than or equal to 0 and less than or equal to 7, and the W2-phase winding 23 is configured by winding a conductor wire 8 into a group of slots 6c in which the slot numbers are Numbers (4+6n), where n is an integer that is greater than or equal to 0 and less than or equal to 7.

As shown in FIG. 4, the first three-phase winding 10 is configured by connecting together the neutral-point connecting portions of the U1-phase winding 11, the V1-phase winding 12, and the W1-phase winding 13. As shown in FIG. 5, the second three-phase winding 20 is configured by connecting together the neutral-point connecting portions of the U2-phase winding 21, the V2-phase winding 22, and the W2-phase winding 23. The first three-phase winding 10 and the second three-phase winding 20 that are configured in this manner are disposed so as to have a phase difference of thirty electrical degrees.

Figure 10:
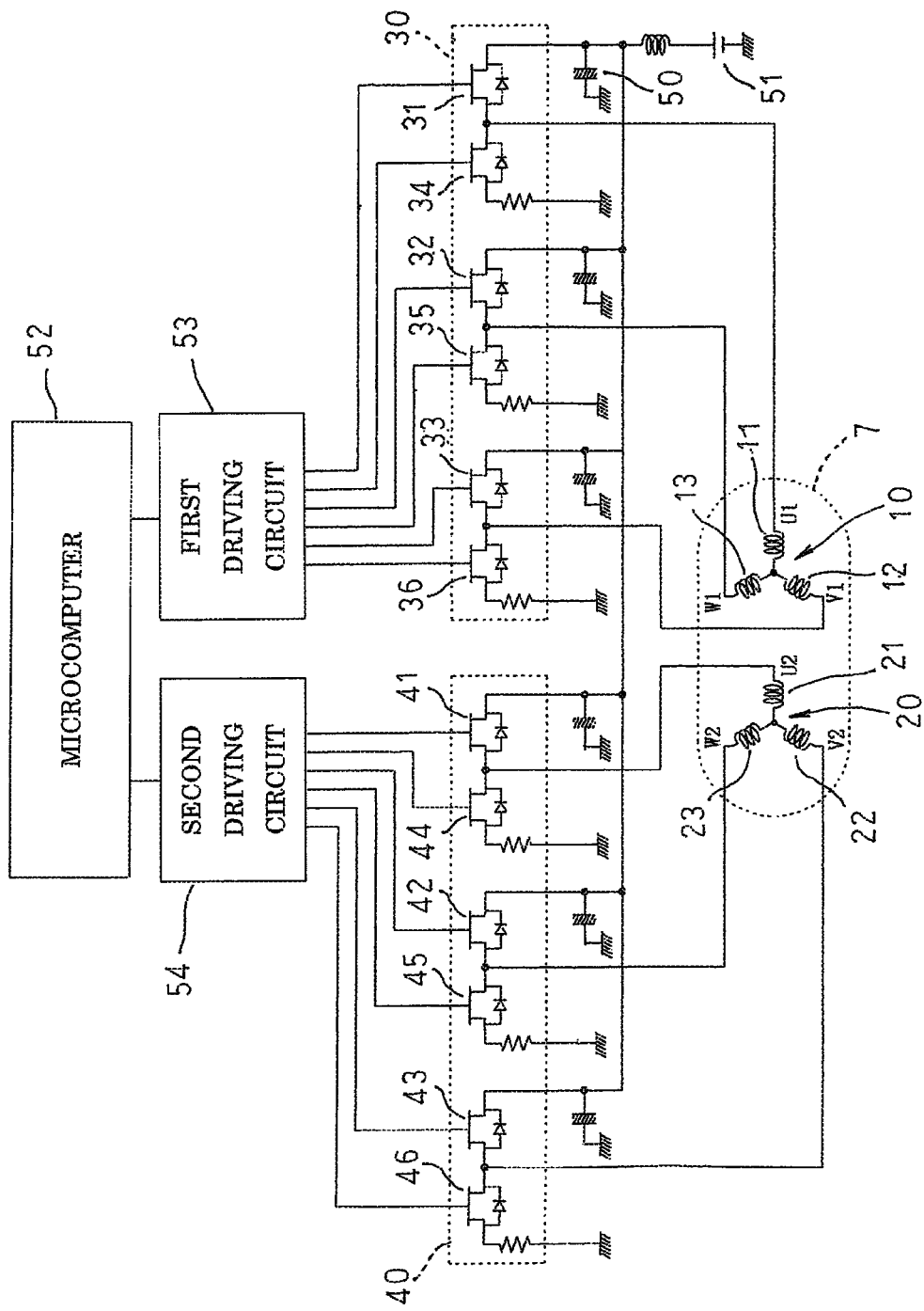
FIG. 10 is a circuit diagram that shows the permanent-magnet three-phase duplex motor according to Embodiment 1 of the present invention.

Next, a configuration of a driving control portion of the permanent-magnet three-phase duplex motor 100 will be explained with reference to FIG. 10. Moreover, FIG. 10 is a circuit diagram that shows the permanent-magnet three-phase duplex motor according to Embodiment 1 of the present invention.

The permanent-magnet three-phase duplex motor 100 includes a driving control portion that is constituted by a first inverter circuit 30, a second inverter circuit 40, capacitors 50, a battery 51, a microcomputer 52 that functions as a controlling apparatus, a first driving circuit 53, a second driving circuit 54, etc.

The first inverter circuit 30 is formed by bridge-connecting six switching elements 31 through 36. Semiconductor switching elements such as metal-oxide-semiconductor field-effect transistors (MOSFETs), insulated gate bipolar transistors (IGBTs), etc., can be used as the switching elements 31 through 36, and here MOSFETs have been used.

Drains of three of the switching elements 31 through 33 are connected to an electric power supply side. Sources of the switching elements 31 through 33 are respectively connected to drains of the switching elements 34 through 36. Sources of the switching elements 34 through 36 are connected to a ground side. Connecting points of the switching elements 31 and 34 are connected to the output wire of the U1-phase winding 11. Connecting points of the switching elements 32 and 35 are connected to the output wire of the W1-phase winding 13. Connecting points of the switching elements 33 and 36 are connected to the output wire of the V1-phase winding 12.

The second inverter circuit 40 is formed by bridge-connecting six switching elements 41 through 46. Semiconductor switching elements such as MOSFETs, IGBTs, etc., can be used as the switching elements 41 through 46, and here MOSFETs have been used.

Drains of three of the switching elements 41 through 43 are connected to an electric power supply side. Sources of the switching elements 41 through 43 are respectively connected to drains of the switching elements 44 through 46. Sources of the switching elements 44 through 46 are connected to a ground side. Connecting points of the switching elements 41 and 44 are connected to the output wire of the U2-phase winding 21. Connecting points of the switching elements 42 and 45 are connected to the output wire of the W2-phase winding 23. Connecting points of the switching elements 43 and 46 are connected to the output wire of the V2-phase winding 22.

The capacitors 50 maintain electric power supply to the switching elements 31 through 36 and 41 through 46, and remove noise components such as surge currents. The first driving circuit 53 switches the switching elements 31 through 36 of the first inverter circuit 30 on or off. The second driving circuit 54 switches the switching elements 41 through 46 of the second inverter circuit 40 on or off. The microcomputer 52 controls on-off switching of the switching elements 31 through 36 and 41 through 46 by means of the first and second driving circuits 53 and 54 to control driving current that is passed through the U1-phase winding 11, the U2-phase winding 21, the V1-phase winding 12, the V2-phase winding 22, the W1-phase winding 13, and the W2-phase winding 23. In this manner, two systems are provided in the permanent-magnet three-phase duplex motor 100, namely: a first system that includes the first three-phase winding 10, the first inverter circuit 30, and the first driving circuit 53; and a second system that includes the second three-phase winding 20, the second inverter circuit 40, and the second driving circuit 54.

In the permanent-magnet three-phase duplex motor 100 that is configured in this manner, direct-current power from the battery 51 is supplied to the drains of the switching elements 31 through 33 and 41 through 43. On-off switching of the switching elements 31 through 36 and 41 through 46 is then controlled by the microcomputer 52 such that the direct-current power from the battery 51 is converted to alternating-current power, which is supplied to the first and second three-phase windings 10 and 20. Rotating magnetic fields are thereby applied to the permanent magnets 3 of the rotor 1, such that the rotor 1 is driven to rotate. Here, because there is a phase difference of thirty electrical degrees between the driving current that is supplied from the first inverter circuit 30 to the first three-phase winding 10 and the driving current that is supplied from the second inverter circuit 40 to the second three-phase winding 20, electrical angle sixth-order torque ripples that arise due to fifth-order and seventh-order harmonics in the magnetomotive forces of the permanent magnets 3, fifth-order and seventh-order harmonics in the magnetomotive forces of the stator 5, and fifth-order and seventh-order harmonics in the driving current are canceled out and reduced between the first system and the second system.

Now, if the microcomputer 52 detects failure of the second system, for example, then driving of the second driving circuit 54 is stopped, making the driving current that is supplied to the second three-phase winding 20 zero. The torque that is exerted by the second system thereby becomes zero, and the overall output torque of the motor becomes half the normal level. Thus, the microcomputer 52 stops the driving of the second driving circuit 54 and simultaneously controls the on-off switching of the switching elements 31 through 36 of the first inverter circuit 30 by means of the first driving circuit 53 such that the driving current that is supplied to the first three-phase winding 10 is twice the normal level. The torque that is exerted by the first system is thereby twice the normal level, compensating for the torque that should be exerted by the second system, making the overall output torque of the motor no different than normal. Motor performance that is equal to normal levels can thereby be ensured during failure of one system.

Here, because the driving current that is supplied to the first three-phase winding 10 of the first system is twice the normal level, the magnetomotive force from the first three-phase winding 10 is twice the normal level. In the permanent-magnet three-phase duplex motor 100, the unit coils 9 in same-phase phase windings in the first three-phase winding 10 and the second three-phase winding 20, such as in the U1-phase winding 11 and the U2-phase winding 21, for example, are disposed so as to overlap for five slots 6c over a pitch of six slots, as shown in FIG. 9. Thus, even if the driving current of the second system is set to zero, and the driving current of the first system is doubled, the magnetomotive forces in the windings are similar or identical to normal levels in the portions of the five slots 6c in which the unit coils 9 overlap. Consequently, because the magnetic fields that act on the permanent magnets 3 are also similar or identical to normal levels, enabling demagnetization of the permanent magnets 3 to be avoided, decreases in motor performance due to demagnetization of the permanent magnets 3 can be suppressed. The driving current of the normal system can thereby be doubled during failure of one system while maintaining motor body dimensions that are approximately equal to those of normal designs, without demagnetizing the permanent magnets 3.

A permanent-magnet three-phase duplex motor 100 that has such properties is suitable for use in electric power steering apparatuses, in which importance is placed upon size reductions and reliability.

Moreover, in Embodiment 1 above, an eight-pole forty-eight-slot permanent-magnet three-phase duplex motor has been explained, but the combination of the number of poles and the number of slots in the permanent-magnet three-phase duplex motor is not limited thereto.

Embodiment 2

Figure 11:
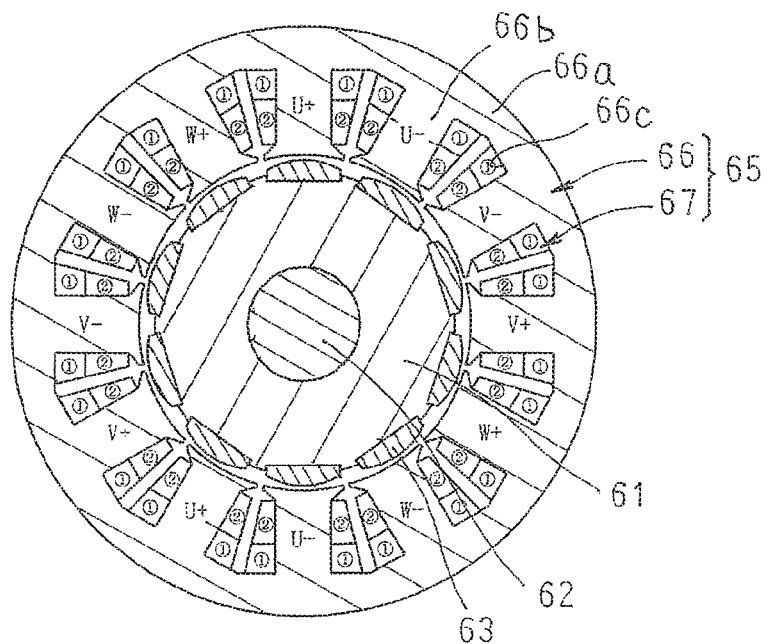
FIG. 11 is a lateral cross section that shows a permanent-magnet three-phase duplex motor according to Embodiment 2 of the present invention.
Figure 12:
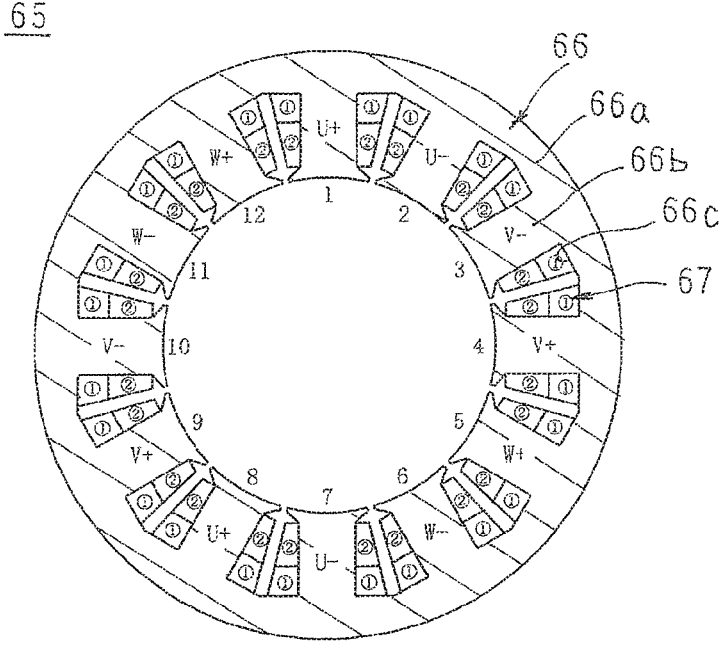
FIG. 12 is a lateral cross section that shows a stator that is used in the permanent-magnet three-phase duplex motor according to Embodiment 2 of the present invention.

FIG. 11 is a lateral cross section that shows a permanent-magnet three-phase duplex motor according to Embodiment 2 of the present invention, and FIG. 12 is a lateral cross section that shows a stator that is used in the permanent-magnet three-phase duplex motor according to Embodiment 2 of the present invention. Moreover, in FIG. 12, numerals from 1 through 12 that are printed circumferentially inside the stator core represent tooth numbers that are allotted sequentially clockwise to teeth that are arranged circumferentially.

In FIGS. 11 and 12, a permanent-magnet three-phase duplex motor 101 includes: a rotor 61 that is fixed to a rotating shaft 62 that is inserted into a central position thereof, and that is rotatably held in a housing (not shown); and a stator 65 that is held in the housing so as to be disposed coaxially with the rotor 61 so as to surround the rotor 61. Ten permanent magnets 63 that form magnetic poles are disposed on an outer circumferential surface of the rotor 61 at a uniform angular pitch circumferentially. The stator 65 includes a stator core 66 that is produced by stacking and integrating electromagnetic steel sheets, in which twelve teeth 66b each protrude radially inward from an annular core back 66a so as to be arranged at a uniform angular pitch circumferentially; and a stator coil 67 that is mounted to the stator core 66. Slots 66c are formed between the core back 66a and the adjacent teeth 66b. The permanent-magnet three-phase duplex motor 101 that is configured in this manner is an ten-pole twelve-slot motor.

Figure 13:
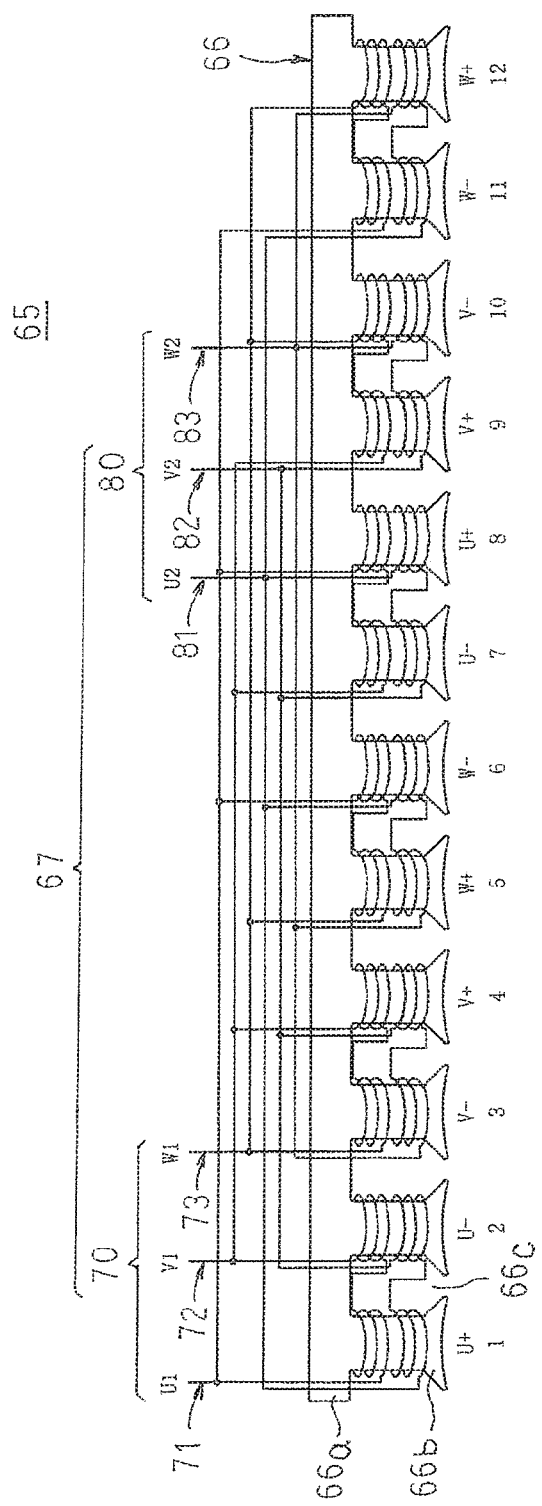
FIG. 13 is a developed projection that shows a stator coil of the stator that is used in the permanent-magnet three-phase duplex motor according to Embodiment 2 of the present invention.
Figure 14:
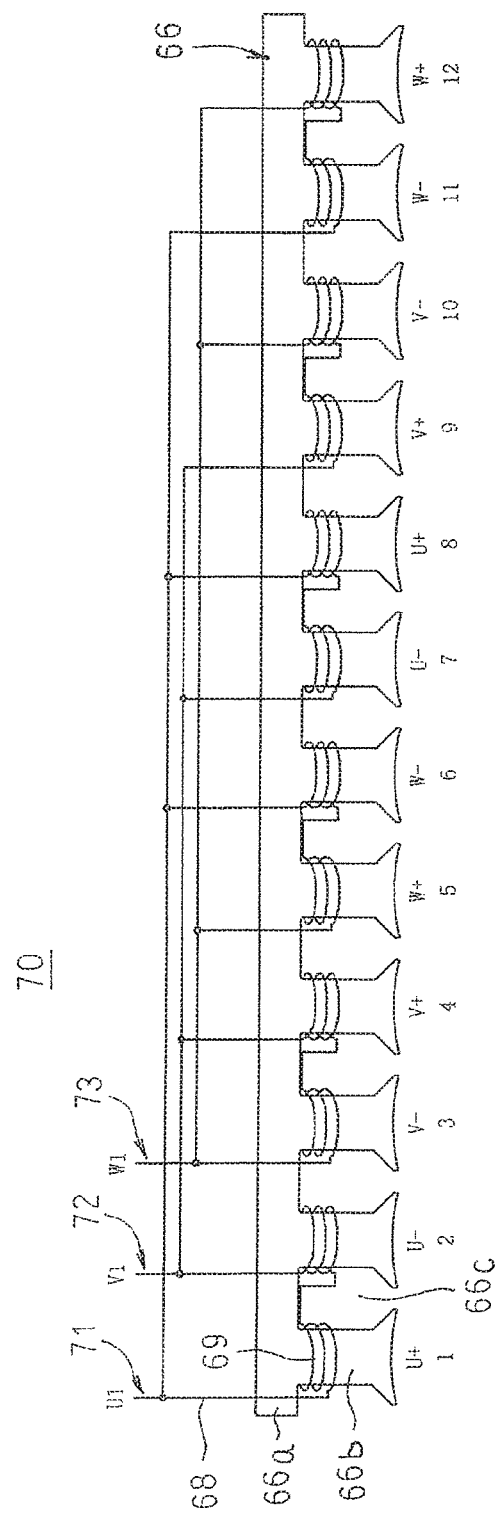
FIG. 14 is a developed projection that shows a first three-phase winding that constitutes part of the stator coil of the stator that is used in the permanent-magnet three-phase duplex motor according to Embodiment 2 of the present invention.
Figure 15:
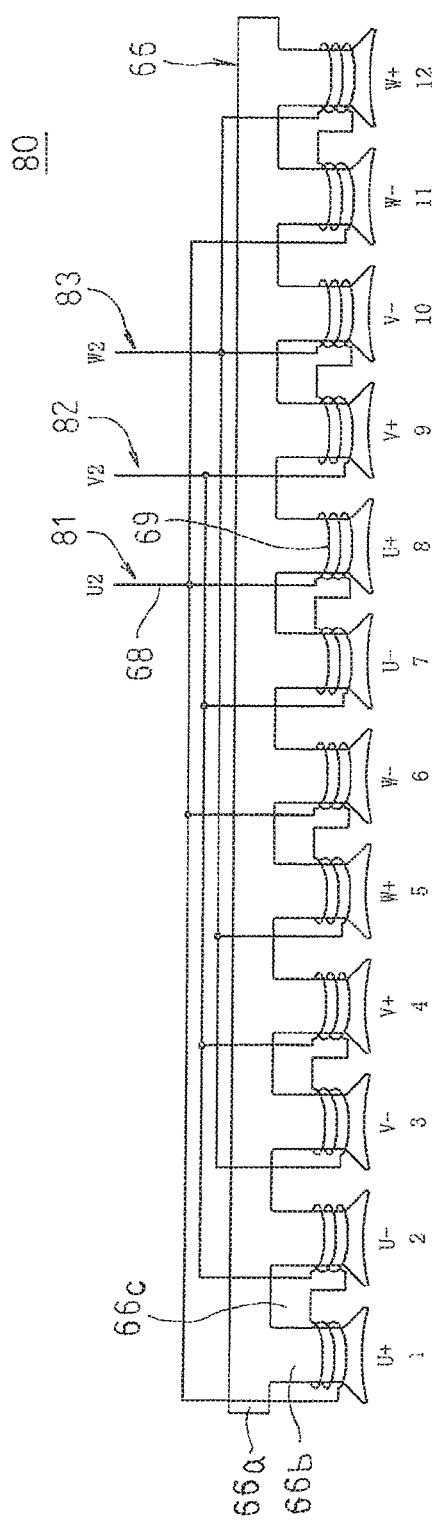
FIG. 15 is a developed projection that shows a second three-phase winding that constitutes part of the stator coil of the stator that is used in the permanent-magnet three-phase duplex motor according to Embodiment 2 of the present invention.

Next, construction of the stator coil 67 will be explained with reference to FIGS. 13 through 15. FIG. 13 is a developed projection that shows a stator coil of the stator that is used in the permanent-magnet three-phase duplex motor according to Embodiment 2 of the present invention, FIG. 14 is a developed projection that shows a first three-phase winding that constitutes part of the stator coil of the stator that is used in the permanent-magnet three-phase duplex motor according to Embodiment 2 of the present invention, and FIG. 15 is a developed projection that shows a second three-phase winding that constitutes part of the stator coil of the stator that is used in the permanent-magnet three-phase duplex motor according to Embodiment 2 of the present invention. Moreover, in each of the figures, the numerals 1 through 12 that are allotted to lower portions of the teeth 66b are tooth numbers.

As shown in FIGS. 13, 14, and 15, the stator coil 67 includes: a first three-phase winding 70 that is formed by delta-connecting a U1-phase winding 71, a V1-phase winding 72, and a W1-phase winding 73; and a second three-phase winding 80 that is formed by delta-connecting a U2-phase winding 81, a V2-phase winding 82, and a W2-phase winding 83.

First, a winding construction of the first three-phase winding 70 will be explained with reference to FIG. 14.

A conductor wire 68 is wound for three turns near a root of the tooth 66b at Number 1 so as to have an insulator (not shown) interposed, and is then subsequently wound for three turns near the root of the tooth 66b at Number 2 so as to have an insulator interposed. Two concentrated winding coils that are wound onto Numbers 1 and 2 are thereby connected in series. Next, a different conductor wire 68 is wound for three turns near the root of the tooth 66b at Number 7 so as to have an insulator interposed, and is then subsequently wound for three turns near the root of the tooth 66b at Number 8 so as to have an insulator interposed. Two concentrated winding coils that are wound onto Numbers 7 and 8 are thereby connected in series. Next, the conductor wire 68 that is wound onto the teeth 66b at Numbers 1 and 2 and the conductor wire 68 that is wound onto the teeth 66b at Numbers 7 and 8 are connected in parallel. The U1-phase winding 71, in which four concentrated winding coils 69 are connected, two in series, two in parallel, is produced thereby.

Next, a conductor wire 68 is wound for three turns near the root of the tooth 66b at Number 4 so as to have an insulator interposed, and is then subsequently wound for three turns near the root of the tooth 66b at Number 3 so as to have an insulator interposed. Two concentrated winding coils that are wound onto Numbers 4 and 3 are thereby connected in series. Next, a different conductor wire 68 is wound for three turns near the root of the tooth 66b at Number 10 so as to have an insulator interposed, and is then subsequently wound for three turns near the root of the tooth 66b at Number 9 so as to have an insulator interposed. Two concentrated winding coils that are wound onto Numbers 10 and 9 are thereby connected in series. Next, the conductor wire 68 that is wound onto the teeth 66b at Numbers 4 and 3 and the conductor wire 68 that is wound onto the teeth 66b at Numbers 10 and 9 are connected in parallel. The V1-phase winding 72, in which four concentrated winding coils 69 are connected, two in series, two in parallel, is produced thereby.

Next, a conductor wire 68 is wound for three turns near the root of the tooth 66b at Number 5 so as to have an insulator interposed, and is then subsequently wound for three turns near the root of the tooth 66b at Number 6 so as to have an insulator interposed. Two concentrated winding coils that are wound onto Numbers 5 and 6 are thereby connected in series. Next, a different conductor wire 68 is wound for three turns near the root of the tooth 66b at Number 11 so as to have an insulator interposed, and is then subsequently wound for three turns near the root of the tooth 66b at Number 12 so as to have an insulator interposed. Two concentrated winding coils that are wound onto Numbers 11 and 12 are thereby connected in series. Next, the conductor wire 68 that is wound onto the teeth 66b at Numbers 5 and 6 and the conductor wire 68 that is wound onto the teeth 66b at Numbers 11 and 12 are connected in parallel. The W1-phase winding 73, in which four concentrated winding coils 69 are connected, two in series, two in parallel, is produced thereby.

Next, a first end of the U1-phase winding 71 and a second end of the W1-phase winding 73 are connected, a first end of the W1-phase winding 73 and a second end of the V1-phase winding 72 are connected, and a first end of the V1-phase winding 72 and a second end of the U1-phase winding 71 are connected, to produce the first three-phase winding 70, which is formed by delta-connecting the U1-phase winding 71, the V1-phase winding 72, and the W1-phase winding 73.

Next, a winding construction of the second three-phase winding 80 will be explained with reference to FIG. 15.

A conductor wire 68 is wound for three turns near a tip of the tooth 66b at Number 8 so as to have an insulator (not shown) interposed, and is then subsequently wound for three turns near the tip of the tooth 66b at Number 7 so as to have an insulator interposed. Two concentrated winding coils that are wound onto Numbers 8 and 7 are thereby connected in series. Next, a different conductor wire 68 is wound for three turns near the tip of the tooth 66b at Number 2 so as to have an insulator interposed, and is then subsequently wound for three turns near the tip of the tooth 66b at Number 1 so as to have an insulator interposed. Two concentrated winding coils that are wound onto Numbers 2 and 1 are thereby connected in series. Next, the conductor wire 68 that is wound onto the teeth 66b at Numbers 8 and 7 and the conductor wire 68 that is wound onto the teeth 66b at Numbers 2 and 1 are connected in parallel. The U2-phase winding 81, in which four concentrated winding coils 69 are connected, two in series, two in parallel, is produced thereby.

Next, a conductor wire 68 is wound for three turns near the tip of the tooth 66b at Number 9 so as to have an insulator interposed, and is then subsequently wound for three turns near the tip of the tooth 66b at Number 10 so as to have an insulator interposed. Two concentrated winding coils that are wound onto Numbers 9 and 10 are thereby connected in series. Next, a different conductor wire 68 is wound for three turns near the tip of the tooth 66b at Number 3 so as to have an insulator interposed, and is then subsequently wound for three turns near the tip of the tooth 66b at Number 4 so as to have an insulator interposed. Two concentrated winding coils that are wound onto Numbers 3 and 4 are thereby connected in series. Next, the conductor wire 68 that is wound onto the teeth 66b at Numbers 9 and 10 and the conductor wire 68 that is wound onto the teeth 66b at Numbers 3 and 4 are connected in parallel. The V2-phase winding 82, in which four concentrated winding coils 69 are connected, two in series, two in parallel, is produced thereby.

Next, a conductor wire 68 is wound for three turns near the tip of the tooth 66b at Number 12 so as to have an insulator interposed, and is then subsequently wound for three turns near the tip of the tooth 66b at Number 11 so as to have an insulator interposed. Two concentrated winding coils that are wound onto Numbers 12 and 11 are thereby connected in series. Next, a different conductor wire 68 is wound for three turns near the tip of the tooth 66b at Number 6 so as to have an insulator interposed, and is then subsequently wound for three turns near the tip of the tooth 66b at Number 5. Two concentrated winding coils that are wound onto Numbers 6 and 5 are thereby connected in series. Next, the conductor wire 68 that is wound onto the teeth 66b at Numbers 12 and 11 and the conductor wire 68 that is wound onto the teeth 66b at Numbers 6 and 5 are connected in parallel. The W2-phase winding 83, in which four concentrated winding coils 69 are connected, two in series, two in parallel, is produced thereby.

Next, a first end of the U2-phase winding 81 and a second end of the W2-phase winding 83 are connected, a first end of the W2-phase winding 83 and a second end of the V2-phase winding 82 are connected, and a first end of the V2-phase winding 82 and a second end of the U2-phase winding 81 are connected, to produce the second three-phase winding 80, which is formed by delta-connecting the U2-phase winding 81, the V2-phase winding 82, and the W2-phase winding 83.

The U1-phase winding 71 and the U2-phase winding 81 are each configured by connecting concentrated winding coils 69, two in series, two in parallel, that are prepared by winding conductor wires 68 on each of the teeth 66b at Numbers 1, 2, 7, and 8. Thus, the concentrated winding coils 69 of the U1-phase winding 71 and the U2-phase winding 81, which are same-phase phase windings, are wound onto identical teeth 66b. Moreover, the concentrated winding coils 69 of the V1-phase winding 72 and the V2-phase winding 82 which are same-phase phase windings, are also wound onto identical teeth 66b. Furthermore, the concentrated winding coils 69 of the W1-phase winding 73 and the W2-phase winding 83, which are same-phase phase windings, are also wound onto identical teeth 66b.

Figure 16:
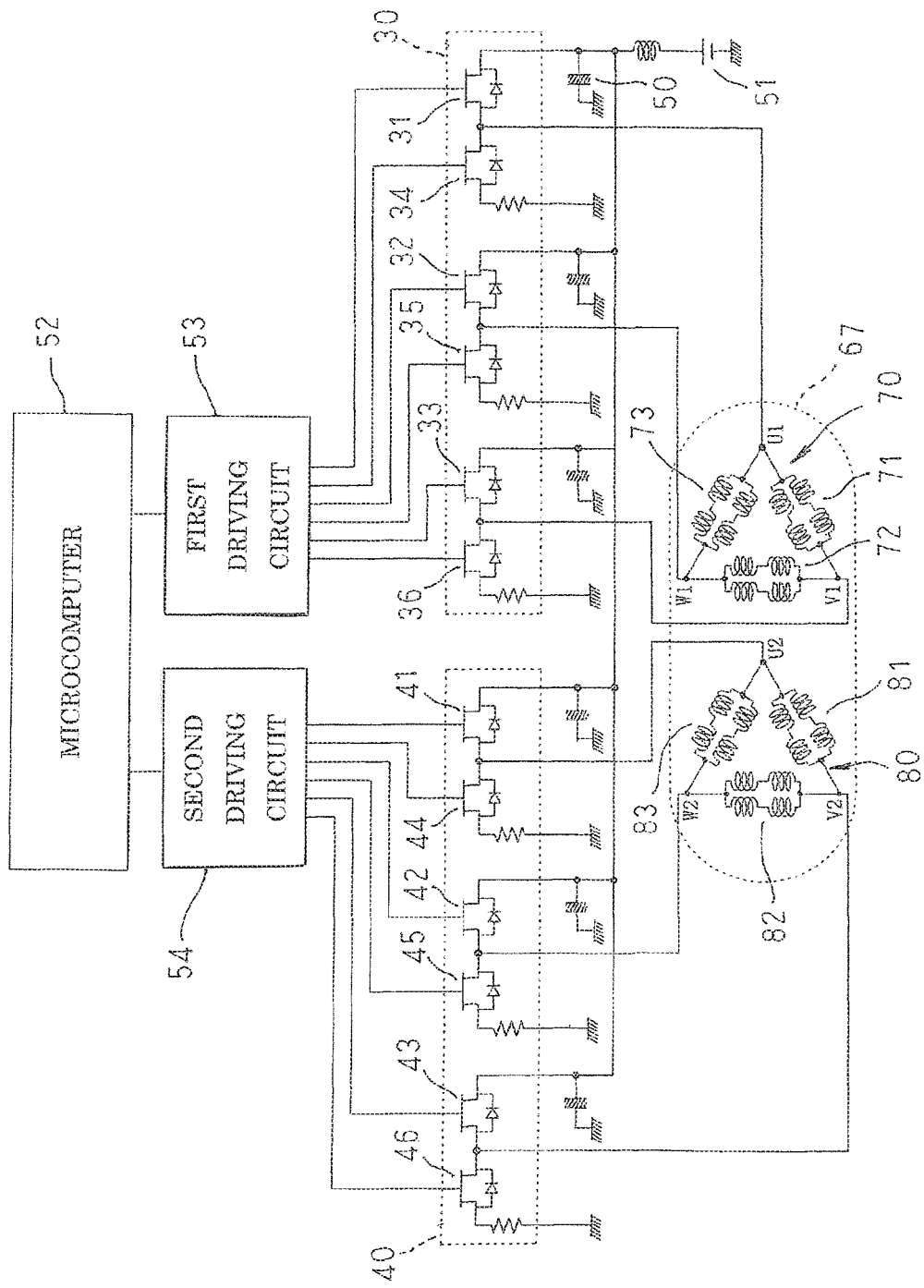
FIG. 16 is a circuit diagram that shows the permanent-magnet three-phase duplex motor according to Embodiment 2 of the present invention.

Next, a configuration of a driving control portion of the permanent-magnet three-phase duplex motor 101 will be explained with reference to FIG. 16. Moreover, FIG. 16 is a circuit diagram that shows the permanent-magnet three-phase duplex motor according to Embodiment 2 of the present invention.

In a similar or identical manner to Embodiment 1, the permanent-magnet three-phase duplex motor 101 includes a driving control portion that is constituted by a first inverter circuit 30, a second inverter circuit 40, capacitors 50, a battery 51, a microcomputer 52, a first driving circuit 53, a second driving circuit 54, etc.

Connecting points of the switching elements 31 and 34 are connected to the connection portion between the U1-phase winding 71 and the W1-phase winding 73. Connecting points of the switching elements 32 and 35 are connected to the connection portion between the W1-phase winding 73 and the V1-phase winding 72. Connecting points of the switching elements 33 and 36 are connected to the connection portion between the V1-phase winding 72 and the U1-phase winding 71.

Connecting points of the switching elements 41 and 44 are connected to the connection portion between the U2-phase winding 81 and the W2-phase winding 83. Connecting points of the switching elements 42 and 45 are connected to the connection portion between the W2-phase winding 83 and the V2-phase winding 82. Connecting points of the switching elements 43 and 46 are connected to the connection portion between the V2-phase winding 82 and the U2-phase winding 81.

The microcomputer 52 controls on-off switching of the switching elements 31 through 36 and 41 through 46 by means of the first and second driving circuits 53 and 54 to control driving current that is passed through the first three-phase winding 70 and the second three-phase winding 80. In this manner, two systems are provided in the permanent-magnet three-phase duplex motor 101, namely: a first system that includes the first three-phase winding 70, the first inverter circuit 30, and the first driving circuit 53; and a second system that includes the second three-phase winding 80, the second inverter circuit 40, and the second driving circuit 54.

In the permanent-magnet three-phase duplex motor 101 that is configured in this manner, on-off switching of the switching elements 31 through 36 and 41 through 46 is controlled by the microcomputer 52 such that the direct-current power from the battery 51 is converted to alternating-current power, which is supplied to the first and second three-phase windings 70 and 80. Rotating magnetic fields are thereby applied to the permanent magnets 63 of the rotor 61, such that the rotor 61 is driven to rotate. Here, the driving current that is supplied from the first inverter circuit 30 to the first three-phase winding 70 and the driving current that is supplied from the second inverter circuit 40 to the second three-phase winding 80 are in phase.

Now, if the microcomputer 52 detects failure of the second system, for example, then driving of the second driving circuit 54 is stopped, making the driving current that is supplied to the second three-phase winding 80 zero. The torque that is exerted by the second system thereby becomes zero, and the overall output torque of the motor becomes half the normal level. Thus, the microcomputer 52 stops the driving of the second driving circuit 54 and simultaneously controls the on-off switching of the switching elements 31 through 36 of the first inverter circuit 30 by means of the first driving circuit 53 such that the driving current that is supplied to the first three-phase winding 70 is twice the normal level. The torque that is exerted by the first system is thereby twice the normal level, compensating for the torque that should be exerted by the second system, making the overall output torque of the motor no different than normal. Motor performance that is equal to normal levels can thereby be ensured during failure of one system.

Here, because the driving current that is supplied to the first three-phase winding 70 of the first system is twice the normal level, the magnetomotive force from the first three-phase winding 70 is twice the normal level. In the permanent-magnet three-phase duplex motor 101, same-phase phase windings in the first three-phase winding 70 and the second three-phase winding 80, such as in the U1-phase winding 71 and the U2-phase winding 81, for example, are disposed on identical teeth 66b. Thus, even if the driving current of the second system is set to zero, and the driving current of the first system is doubled, the magnetomotive forces in the concentrated winding coils 69 are similar or identical to normal levels in the portions of the teeth 66b onto which the concentrated winding coils 69 are wound. Consequently, because the magnetic fields that act on the permanent magnets 63 are also similar or identical to normal levels, enabling demagnetization of the permanent magnets 63 to be avoided, decreases in motor performance due to demagnetization of the permanent magnets 63 can be suppressed. The driving current of a normal system can thereby be doubled during failure of a single system while maintaining motor body dimensions that are approximately equal to those of normal designs, without demagnetizing the permanent magnets 63.

A permanent-magnet three-phase duplex motor 101 that has such properties is suitable for use in electric power steering apparatuses, in which importance is placed upon size reductions and reliability.

Moreover, in Embodiment 2 above, a ten-pole twelve-slot permanent-magnet three-phase duplex motor has been explained, but the combination of the number of poles and the number of slots in the permanent-magnet three-phase duplex motor is not limited thereto.

The invention claimed is:

1. A permanent-magnet three-phase duplex motor comprising:
a rotor in which permanent magnets are arranged circumferentially;
a stator that comprises a stator coil that is constituted by a first three-phase winding and a second three-phase winding;
a first inverter circuit that supplies a driving current to said first three-phase winding;
a second inverter circuit that supplies a driving current to said second three-phase winding; and
a controlling apparatus that controls operation of said first inverter circuit and said second inverter circuit,
wherein:
said controlling apparatus is configured such that said driving current that is supplied from each of said first inverter circuit and said second inverter circuit to said first three-phase winding and said second three-phase winding during normal operation is set to a first electric current, and when one of said first inverter circuit and said second inverter circuit fails, said controlling apparatus stops operation of said failed inverter circuit, and controls operation of a normal inverter circuit to two times said first electric current to increase said driving current that is supplied from said normal inverter circuit to increase the torque induced on the motor from the normal inverter circuit; and
said first three-phase winding and said second three-phase winding are configured such that magnetic fields that act on said permanent magnets in a demagnetizing direction when said driving current that is increased to two times said first electric current is supplied from said normal inverter circuit are identical to magnetic fields that normally act on said permanent magnets in said demagnetizing direction.

2. The permanent-magnet three-phase duplex motor according to claim 1, wherein:
phase windings that constitute said first three-phase winding and said second three-phase winding are configured by connecting a plurality of unit coils that are each configured by winding a conductor wire into slots that are positioned on two sides of a plurality of contiguous teeth; and
circumferential regions between said slots into which said unit coils are wound that constitute same-phase phase windings of said first three-phase winding and said second three-phase winding overlap.

3. The permanent-magnet three-phase duplex motor according to claim 2, wherein said first three-phase winding and said second three-phase winding are disposed so as to have a phase difference of thirty electrical degrees.

4. The permanent-magnet three-phase duplex motor according to claim 3, wherein a number of poles in said rotor is eight, and a number of slots in said stator is forty-eight.

5. An electric power steering apparatus that comprises the permanent-magnet three-phase duplex motor according to claim 4.

6. A permanent-magnet three-phase duplex motor comprising:
a rotor in which permanent magnets are arranged circumferentially;
a stator that comprises a stator coil that is constituted by a first three-phase winding and a second three-phase winding;
a first inverter circuit that supplies a driving current to said first three-phase winding;
a second inverter circuit that supplies a driving current to said second three-phase winding; and
a controlling apparatus that controls operation of said first inverter circuit and said second inverter circuit,
wherein:
said controlling apparatus is configured such that when one of said first inverter circuit and said second inverter circuit fails, said controlling apparatus stops operation of said failed inverter circuit, and controls operation of a normal inverter circuit to increase said driving current that is supplied from said normal inverter circuit to increase the torque induced on the motor from the normal inverter circuit; and
said first three-phase winding and said second three-phase winding are configured such that magnetic fields that act on said permanent magnets in a demagnetizing direction when said increased driving current is supplied from said normal inverter circuit are equal to magnetic fields that normally act on said permanent magnets in said demagnetizing direction,
wherein:
phase windings that constitute said first three-phase winding and said second three-phase winding are configured by connecting a plurality of concentrated winding coils that are each configured by winding a conductor wire onto a single tooth; and said concentrated winding coils that constitute same-phase phase windings of said first three-phase winding and said second three-phase winding are wound onto identical teeth.

7. The permanent-magnet three-phase duplex motor according to claim 6, wherein a number of poles in said rotor is ten, and a number of slots in said stator is twelve.

8. An electric power steering apparatus that comprises the permanent-magnet three-phase duplex motor according to claim 7.

* * * * *